United States Patent

[11] 3,587,064

[72] Inventor Ettore Stanghellini
Milan, Italy

[21] Appl. No. 591,843
[22] Filed Nov. 3, 1966
[45] Patented June 22, 1971
[73] Assignee Olivetti-General Electric S.p.A.
Caluso (Turin), Italy
[32] Priority Nov. 3, 1965
[33] Italy
[31] 24373/65

[54] SELECTION CIRCUIT FOR MEMORY LINES
4 Claims, 4 Drawing Figs.

[52] U.S. Cl. ........ 340/174
[51] Int. Cl. ........ G11c 7/00
[50] Field of Search ........ 340/174 M, 166

[56] References Cited

UNITED STATES PATENTS

| | | | |
|---|---|---|---|
| 3,192,510 | 6/1965 | Flaherty | 340/174 |
| 3,222,658 | 12/1965 | Bruce et al. | 340/174 |
| 2,931,015 | 3/1960 | Bonn et al. | 340/174 |
| 2,931,016 | 3/1960 | Bonn et al. | 340/174 |
| 3,154,763 | 10/1964 | Bornhauser | 340/174 |
| 3,231,753 | 1/1966 | Brown, Jr. | 307/88 X |

*Primary Examiner*—James W. Moffitt
*Attorneys*—George V. Eltgroth and Joseph B. Forman

ABSTRACT: A selection circuit is disclosed for selectively sending pulses of opposite polarity to a two-terminal load element selected from a multiplicity of such elements and which circuit is particularly suitable for magnetic core memory line selection. Through the use of oppositely poled diode pairs at each end of a line and of transformer coupling, stray current transients are suppressed and the number of pulse generators and selecting switches is reduced to a minimum.

INVENTOR.
Ettore Stanghellini
BY George V Eltgroth and
Joseph B Forman

INVENTOR.
Ettore Stanghellini
BY George V. Eltgroth and
Joseph B. Forman

INVENTOR.
Ettore Stanghellini
BY George V. Eltgroth and
Joseph B. Forman

SELECTION CIRCUIT FOR MEMORY LINES

This invention relates to the devices for selecting circuit elements, particularly memory lines in ferrite core matrix stores, wherein said selection is obtained by means of diode matrices cooperating with two sets of switches.

Arrangements of different circuit elements for driving core lines in memory matrices by means of current pulses are known. For instance, in matrices arranged for coincidence selection, a pulse generator common to all N lines of one selection coordinate (X or Y) is used, whereby a convenient number of switches permits selecting one line among N such lines in order to send a drive pulse on said selected line.

The lines are divided in groups, each one of said groups comprising the same number of lines. Two sets of switches are so arranged, whereby each switch of the first set selects one particular group, and each switch of the second set selects one particular line in each group. Therefore, if the number of groups approximates $\sqrt{N}$, and the number of lines in each group is also approximately $\sqrt{N}$, to select a line among said N lines the number of switches needed is approximately $2\sqrt{N}$.

To prevent stray currents which would flow through paths comprising nonselected lines, each line is provided with a diode at one of its ends. However, in many cases it is convenient to be able to send pulses in opposite directions on the same line at different times; for instance, when read and write pulses are sent on the same line. In such cases, one end of the line is provided with two diodes, one for each flow direction of the current.

The circuit comprising the write pulse generator must then be separated from the circuit comprising the read pulse generator. Such arrangements are described for instance in the book of C.J. Quartly "Square Loop Ferrite Circuitry" London 1962.

Said arrangements, however, do not prevent unwanted current transients, caused by the capacitance of nonselected lines; moreover, bidirectional switches are required on that part of the circuit, on which the current flows in both directions, and pairs of unidirectional switches are needed in that part of the circuit, which is duplicated for separating the currents flowing in opposite directions. As the switches are in general properly connected transistors, the number of such transistors wanted for selecting one line among N is approximately $4\sqrt{N}$.

One purpose of the present invention is to provide an effective suppression of stray current transients, due to the capacitance of nonselected lines.

Another purpose of the invention is to substantially lower the number of transistors needed to select one line.

Another purpose of the invention, alternative to the preceding one, is to allow the use of a single pulse generator, common for write and read pulses.

According to the invention the lines of the memory are provided with two diodes for each end, and the nonselected lines are held at such a voltage as to reversely bias some of said diodes in order to stop the voltage pulses at the very input end of the nonselected lines. The parts of circuit comprising the line and its diodes are nonconductively connected to those parts of the circuit which comprise the pulse generators and the selection switches pertaining to one set of said switches; it is therefore possible to use a single switch of said set both for read and write selection, or, alternatively, to use a single pulse generator both for read and write pulses.

The present invention is not limited to the selection of memory lines in core storages using coincidence selection methods: it can also apply to storage units using different methods, such as the word selection method; and also to memories of different construction such as thin film memories, cryogenic memories, and in general for selecting one out of a number of two-terminal circuit elements, through which the current may flow in both directions.

These and other features and advantages of the invention will become apparent from the following description of a preferred embodiment thereof, taken in conjunction with the accompanying drawings, in which.

Figure 1:
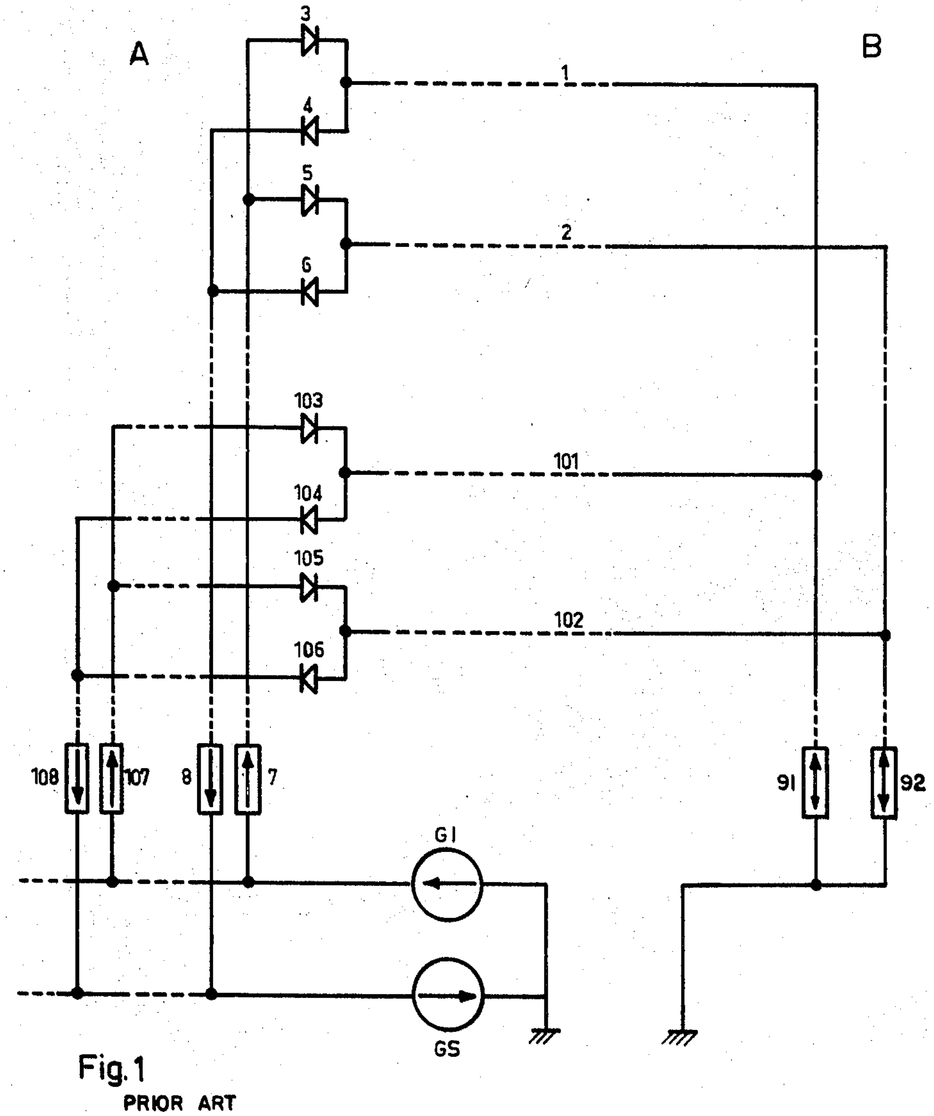
Fig. 1 PRIOR ART
FIG. 1 represents four lines of a memory matrix, according to prior art.

FIG. 1 shows the prior art arrangement of the circuit elements for selecting a line. For clarity only two line groups and only two lines per group are represented. Lines 1,2.... pertain to one group, lines 101,102.... to the other group.

Each memory line is terminated at one end, on the side of the matrix indicated by A, with a pair of diodes, that is, with diodes 3,4; 5,6;....103,104; 105,106;.... Diodes 3,5.... are connected to the unidirectional switch 7, diodes 103,105.... to unidirectional switch 107. Diodes 4,6 are connected to unidirectional switch 8, diodes 104,106 to unidirectional switch 108. Switches 7....107 are connected to the read pulse generator GI and switches 8,....108 to write pulse generator GS, in the manner shown.

By each unidirectional switch 7,8....107,108 the arrow indicates the allowed direction of the current.

On the opposite side of the matrix, indicated by B, lines 1....101 are connected to bidirectional switch 91, lines 2....102 to bidirectional switch 92. All switches on side B are connected to earth by their other terminal.

To select, for instance, line 1 for reading, switches 7 and 91 are closed, and a read pulse is sent by pulse generator GI. Said pulse flows through the circuit comprising switch 7, diode 3, line 1, switch 91. Said circuit is the only circuit which is completed by closing both switches 7 and 91. However, said pulse is also applied to the input terminal of the nonselected line 2 through diode 5; and the steep fronts of said pulse reach the earth through the capacitance of line 2 although switch 92 is open. The same happens to the remaining nonselected lines (not shown) like line 2, which are connected to switch 7. Said current needlessly loads the generator, and acts as noise signals.

When line 1 is selected for writing, switches 8 and 91 are closed thereby completing the circuit comprising the write pulse generator GS, switch 8, diode 4, line 1 and switch 91. In this case, line 2 will be subject to noise pulses which reach generator GS through the capacitance to earth of line 2, diode 6 and switch 8. The same also happens to the remaining nonselected lines (not shown) like line 2, which are connected to switch 8.

Figure 2:
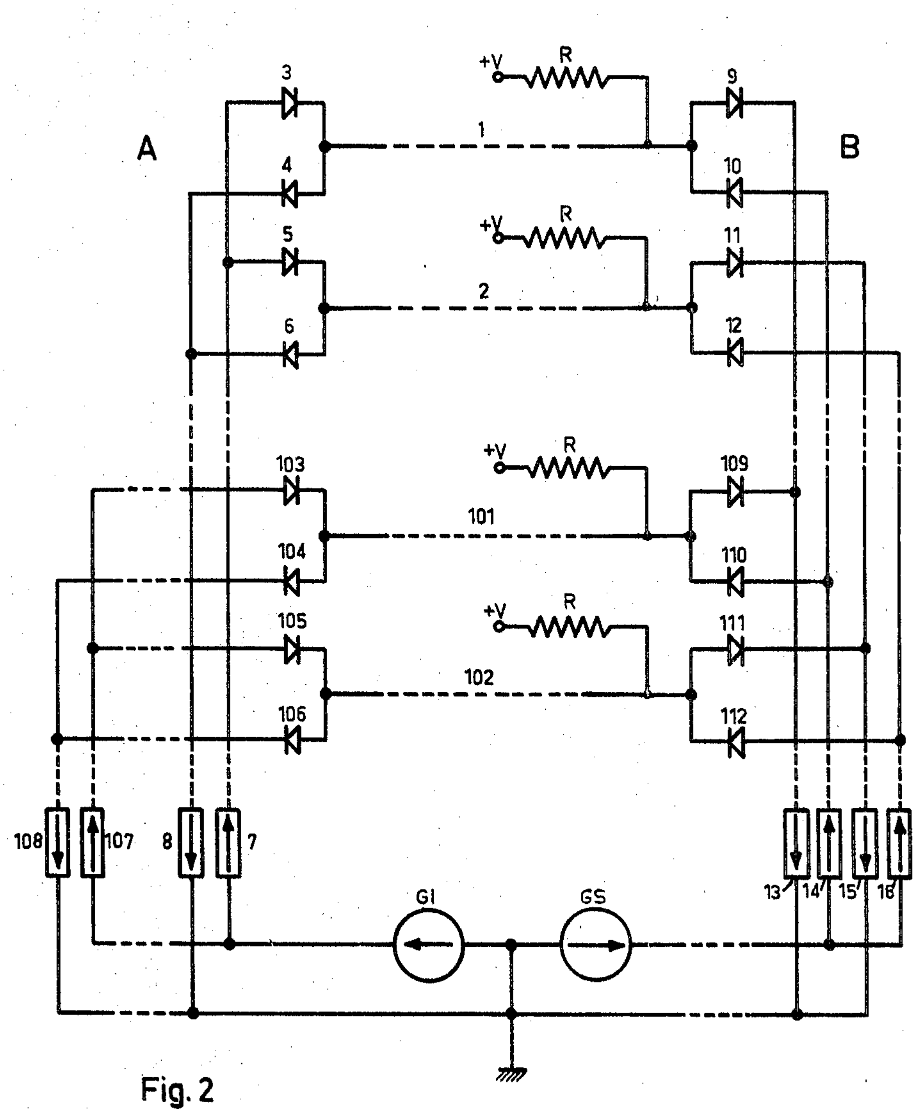
FIG. 2 represents four lines of a memory matrix, according to the invention.

In FIG. 2 a disposition, according to the invention, is shown, which is adapted to eliminate said inconveniences.

Each line 1,2....101,102.... is provided, at each end, with a pair of diodes 3,4; 5,6;....103,104; 105,106.... on side B. The diodes on side A are connected respectively to unidirectional switches 7,8....107,108.... in the same way as shown in FIG. 1; on side B, pairs of unidirectional switches 13,14; 15,16;.... are provided.

Diodes 9....109 are connected to switch 13; diodes 10....110 to switch 14; diodes 11....111 to switch 15; diodes 12....112 to switch 16, and so on.

The write and read pulse generators GS and GI are so connected, as shown in FIG. 2, that the polarity of the voltage variation due to the pulses applied to the nonselected lines is the same (in the example: positive) both for the read and write pulses. This is obtained, as shown, by connecting to earth the negative terminal of both generators and connecting their positive terminals, through switches and diodes, to opposite ends of the lines.

Each line is connected, through a resistor R of sufficiently high value, to a voltage source V, which in the example set forth is positive, and greater than the maximum peak voltage reached in the absence of a load by the write or read pulses.

Consider now the case wherein line 1 is selected for reading. Switches 7 and 13 are closed and, through the latter, the line is maintained at virtually earth potential.

The read pulse produced by generator GI flows through switch 7, diode 3 unbiased, diode 9, switch 13. Line 2, on the contrary, is maintained at a voltage near to that of the voltage source, +V, coupled through resistor R because switches 8 and 15 are open. Diodes 5 and 12 are reversely biased, and, in particular, diode 5 prevents the read pulse coming from generator GI from entering line 2. No current transients flow through the line, and the pulse is not affected by the line capacity.

In the case of a write pulse, if line 1 is to be selected, switches 14 and 8 are closed, and therefore line 1 is practically at earth potential. The write pulse flows through switch 14, diode 10 unbiased, line 1, diode 4, switch 8, to earth. The non-selected line 101, connected on side B to switch 14, is held at voltage +V by the fact that switch 108 is open, and therefore diodes 103 and 110 are reversely biased. In particular, diode 110 prevents the write pulse from entering line 101.

It is clear that what has been said of line 2, relating to the read pulse, and of line 101, relating to the write pulse, is equally valid for all lines, not shown, pertaining to the group of lines connected to switch 7 (for read pulse) and for these lines, not shown, of different groups, connected to switch 14 (for write pulse).

Considering now the arrangement as illustrated in FIG. 2, it may be seen that when line 1 is selected for reading by closing switch 7 on side A, and switch 13 on side B, switch 14, on side B, which is intended to select said line for writing, also could be closed without any inconvenience, because the write pulse generator GS does not generate any pulse in the time interval reserved to the reading operations.

On the contrary, switch 8 cannot be closed, because in this case line 2 would be connected to earth, removing the inverse bias of diodes such as diode 5 of line 2, of the other non-selected lines. However, as indicated, switches 14 and 7 could open and close both at the same time.

They could therefore be replaced by a single switch, the distinction between the reading and writing functions being retained due to the fact that the write and read pulses are produced by different generators, in different intervals of time.

Such replacement of both switches by a single switch is practically possible only if the circuit comprising the line 1, together with the diodes 3, 4, 9, 10, connected to its ends, is conductively separated from the circuit comprising both generators GI and GS and the said single switch. Such disposition is represented by FIG. 3, wherein the switches are shown in the preferred form of realization, that is, by means of circuits embodying transistors.

Figure 3:
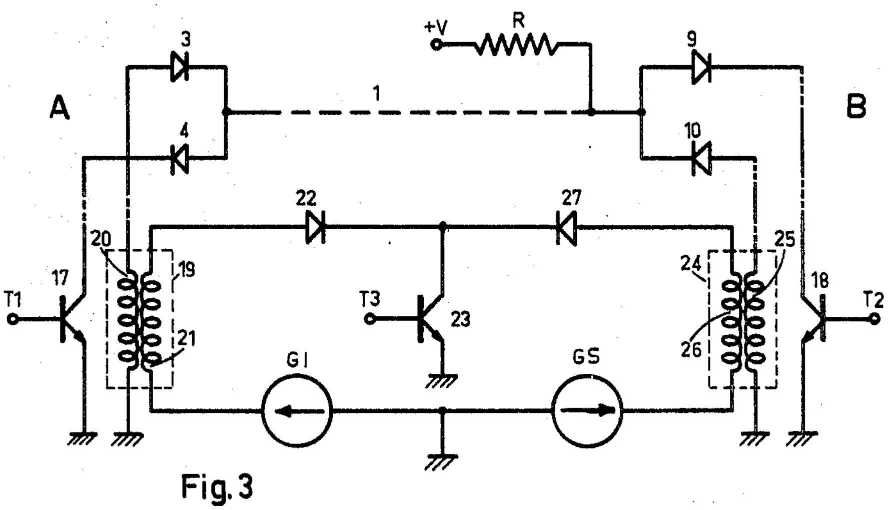
FIG. 3 shows a line of a memory matrix and its selection circuits according to one embodiment of the invention.

In FIG. 3 only line 1 and the related selection devices are shown. Said line is provided, at both ends, with diodes 3 and 4 on side A and 9 and 10 on side B.

Transistor 17, having its collector connected to voltage source +V through diode 4, line 1 and resistor R, corresponds to the switch 8 of FIG. 1 and 2.

Its emitter is connected to the earth, and its base to terminal $T_1$, through which it receives the control signals which cause it to pass from the conducting to the blocking state, and vice versa.

On side B transistor 18, connected in the same way as transistor 17, and receiving the control signals through terminal $T_2$, corresponds to switch 13 of FIG. 2.

In place of switch 7 of FIG. 1 and 2, connected to the read pulse generator, there is, (FIG. 3) a transformer 19, whose secondary winding 20 is, at one end, connected to diode 3 of line 1, and to other diodes similarly connected to other non-selected lines of the same group. The other end of said secondary winding is connected to earth.

Primary winding 21 of transformer 19 has one end connected to the output of read pulse generator GI, and the other end connected, through diode 22, to the collector of NPN transistor 23, whose emitter is connected to earth, and whose base is connected to terminal T3, through which the control signals are received.

On side B, in place of switch 14 of FIG. 2, there is a transformer 24, (FIG. 3), whose secondary winding 25 has one end connected to earth, and the other end connected to diode 10 of line 1, and to other diodes similarly connected to non-selected lines occupying the same place in different groups. Primary winding 26 has one end connected to the output of write pulse generator GS and the other end, through diode 27, coupled to the collector of transistor 23.

Therefore transistor 23 operates as common switch both for the write and read circuits of line 1 and other lines, while said write and read circuits are not connected conductively.

Diodes 22 and 27 prevent any reciprocal influence between the circuits comprising primary windings 21 and 26.

To send a reading pulse on line 1, transistors 18 and 23 are made conductive, by means of proper control signals applied to terminal T2 and T3. Therefore line 1 is connected to earth through transistor 18 and the reverse bias on diode 3 is removed. Subsequently, read pulse generator GI sends a pulse through the circuit comprising the primary winding 21, diode 22, transistor 23 and earth. Diode 27 prevents said pulse from influencing primary winding 26 of transformer 24. The pulse through primary winding 21 of transformer 19 causes a read pulse to flow through secondary winding 20, line 1, diode 9 and transistor 18.

To send a write pulse on line 1, transistors 17 and 23 are made conductive by means of proper control signals applied to terminals T1 and T3. Therefore line 1 is connected to earth through transistor 17 and the reverse bias of diode 10 is removed.

Subsequently, write pulse generator GS sends a pulse through the circuit comprising the primary winding 26 of transformer 24, diode 27, and transistor 23. Diode 22 prevents said pulse from influencing primary winding 21 of transformer 19. The pulse through primary winding 26 causes a write pulse to flow through secondary winding 25, diode 10, line 1, diode 4, transistor 17, to earth.

Figure 4:
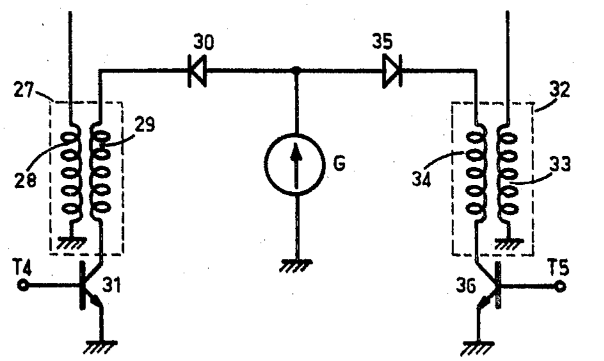
FIG. 4 shows a line of a memory matrix, and its selection devices according to another embodiment of the invention.

FIGURE 4 represents an alternative arrangement, using two separate switches for write and read pulses, and a common write and read pulse generator. Secondary winding 28 of transformer 27 and secondary winding 33 of transformer 32 are respectively connected in the manner already shown for secondary winding 20 of transformer 19 and secondary winding 25 of transformer 24 in FIG. 3.

Primary windings 29 and 34 are connected, at one end, to the common pulse generator G through respective diodes 30 and 35; and, at the other end, to the respective collectors of NPN transistors 31 and 36.

Transistors 31 and 36 have their emitters connected to earth, and receive control signals through respective terminals T4 and T5 connected to their bases. When transistor 31 is conducting and transistor 36 is blocked, the pulse generated by generator G flows through primary winding 29 and causes a read pulse to flow through secondary winding 28 and the circuits connected to it. When transistor 36 is conducting, and transistor 31 blocked, the pulse generated by generator G causes a write pulse to flow through secondary winding 33. Diodes 30 and 35 prevent any mutual influence between the circuits of primary windings 29 and 34.

It should be understood that said switching operations may be obtained not only by the use by transistors, but also of other devices known to those skilled in the art, such as electronic tubes, diode AND gates, and others; and that, in general, the foregoing disclosure relates only to a preferred embodiment of the invention, and that it is intended to cover all changes and modifications of the example of the invention herein chosen for the purpose of the disclosure which do not constitute departures from the spirit and scope of the invention.

What I claim is:

1. A selection circuit for sending electrical currents in opposite directions through any selected one of a plurality of two-terminal load elements, comprising, in combination: a pair of oppositely poled diodes connected to each terminal of each of said load elements, a direct current voltage source, a resistor connected between said source and each of said load elements, a first unidirectional switching means connected to one of said diodes at one terminal of each of said load elements, a second unidirectional switching means connected to one of said diodes at the other terminal of each of said load elements, a set of third unidirectional switching means, first and second pulse generators, means for conductively connecting said first and second pulse generators in circuit with said third switching means to form two sets of associated circuits, means for transformer-coupling each of said associated circuits to the other of said diodes of a respective subset of said terminals, whereby closing one of said first and one of said third switching means sends pulse current through a selected one of said load elements in one direction, and closing one of said second and one of said third switching means sends pulse current through a selected one of said load elements in the opposite direction.

2. A selection circuit for sending a sequence of electrical pulses of selectable opposite directions through a two-terminal load element selected from among a plurality of such load elements, comprising, in combination: a pulse generator for sending electrical pulses to said plurality of two-terminal load elements, a plurality of unidirectional switching means subdivided into first, second, third, and fourth sets, said first and third sets of switching means being conductively connected to said pulse generator, thereby forming two sets of associated circuits, each of said associated circuits being transformer coupled to a selected subset of said two-terminal load elements, said sets being so connected that any one of said two-terminal load elements is selected by closing one switching means of said first set and one switching means of said second set for sending pulses therethrough in a first direction, and by closing one switching means of said third set and one switching means of said fourth set for sending pulses therethrough in a second direction opposite to said first direction, each of said load elements being connected at each terminal to a pair of oppositely poled diodes and being resistively connected to a direct current voltage source, the voltage of said source providing a bias respective said diodes for effectively preventing any one of said pulses from flowing into any portion of the circuit associated with nonselected load elements.

3. A selection circuit for sending electrical currents in opposite directions through any selected one of a plurality of two-terminal load elements, comprising, in combination: a pair of oppositely poled diodes connected to each terminal of each of said load elements, a direct current voltage source, a resistor connected between said source and each of said load elements, a first unidirectional switching means connected to one of said diodes at one terminal of each of said load elements, a second unidirectional switching means connected to one of said diodes at the other terminal of each of said load elements, sets of third and fourth unidirectional switching means, a single pulse generator, means for conductively connecting said third and fourth of switching means in circuit with said pulse generator to form two sets of associated circuits, means for transformer-coupling each of said associated circuits to the other of said diodes of a respective subset of said terminals, whereby closing one of said first and one of said third switching means sends pulse current through a selected one of said load elements in one direction, and closing one of said second and one of said fourth switching means sends pulse current through a selected one of said load elements in the opposite direction.

4. A selection circuit for sending a sequence of electrical pulses in selectable opposite directions through a two-terminal load element selected from among a plurality of such load elements, comprising, in combination: first and second pulse generators, for providing electrical pulses to said plurality of two-terminal loads, a plurality of unidirectional switching means subdivided into first, second and third sets, the first set being conductively connected to said pulse generators thereby providing two sets of associated circuits comprising said switching means of said first set and said pulse generators, each one of said associated circuits being transformer coupled to a selected subset of said two-terminal load elements, said second and third sets of said switching means being connected so that any of said two-terminal load elements are selected by operating one switching means of said first set and one switching means of said second set for sending pulses therethrough in a first direction and by operating one switching means of said first set and one switching means of said third set, for sending pulses therethrough in a direction opposite to said first direction, each of said load elements being connected at each terminal to a pair of oppositely poled diodes, and being resistively connected to a direct current voltage source to provide a bias respective said diodes for preventing any one of said pulses from flowing into any circuit of any nonselected load element.